United States Patent [19]

Alberino et al.

[11] 4,385,133

[45] May 24, 1983

[54] NOVEL COMPOSITIONS AND PROCESS

[75] Inventors: Louis M. Alberino, Cheshire; Robert J. Lockwood, North Branford, both of Conn.

[73] Assignee: The Upjohn Company, Kalamazoo, Mich.

[21] Appl. No.: 385,930

[22] Filed: Jun. 7, 1982

[51] Int. Cl.³ .............................................. C08G 18/14
[52] U.S. Cl. .................................. 521/159; 521/176; 521/914; 528/66; 528/76; 528/77
[58] Field of Search ...................... 521/159, 176, 914; 528/66, 76, 77

[56] References Cited

U.S. PATENT DOCUMENTS

| | | | |
|---|---|---|---|
| 3,798,200 | 3/1974 | Kaneko et al. | 528/65 |
| 3,857,800 | 12/1974 | Fishbein et al. | 521/174 |
| 3,945,939 | 3/1976 | Barron | 521/174 |
| 3,963,681 | 6/1976 | Kaneko et al. | 528/61 |
| 4,065,410 | 12/1977 | Schäfer et al. | 521/51 |
| 4,273,884 | 6/1981 | Dominguez | 521/114 |

*Primary Examiner*—Maurice J. Welsh
*Attorney, Agent, or Firm*—Denis A. Firth; John Kekich

[57] ABSTRACT

Polyurethanes having a two phase morphology and characterized by high impact strength and, optionally, high modulus are obtained by reaction of 4,4'-methylenebis(phenyl isocyanate) and modified forms thereof with an aliphatic glycol extender and a blend of at least two polyoxypropylene-polyoxyethylene polyols both of which have average functionalities in the range of 2 to 4, one of which has a molecular weight in the range of about 3000 to 10,000 and contains at least 23 percent by weight of ethylene oxide residues and the other has a molecular weight in the range of about 750 to about 2000 and contains at least 45 percent by weight of ethylene oxide. The two or more such polyols are employed in proportions such that the aliphatic glycol extender is completely miscible with said polyols if blended together.

12 Claims, 1 Drawing Figure

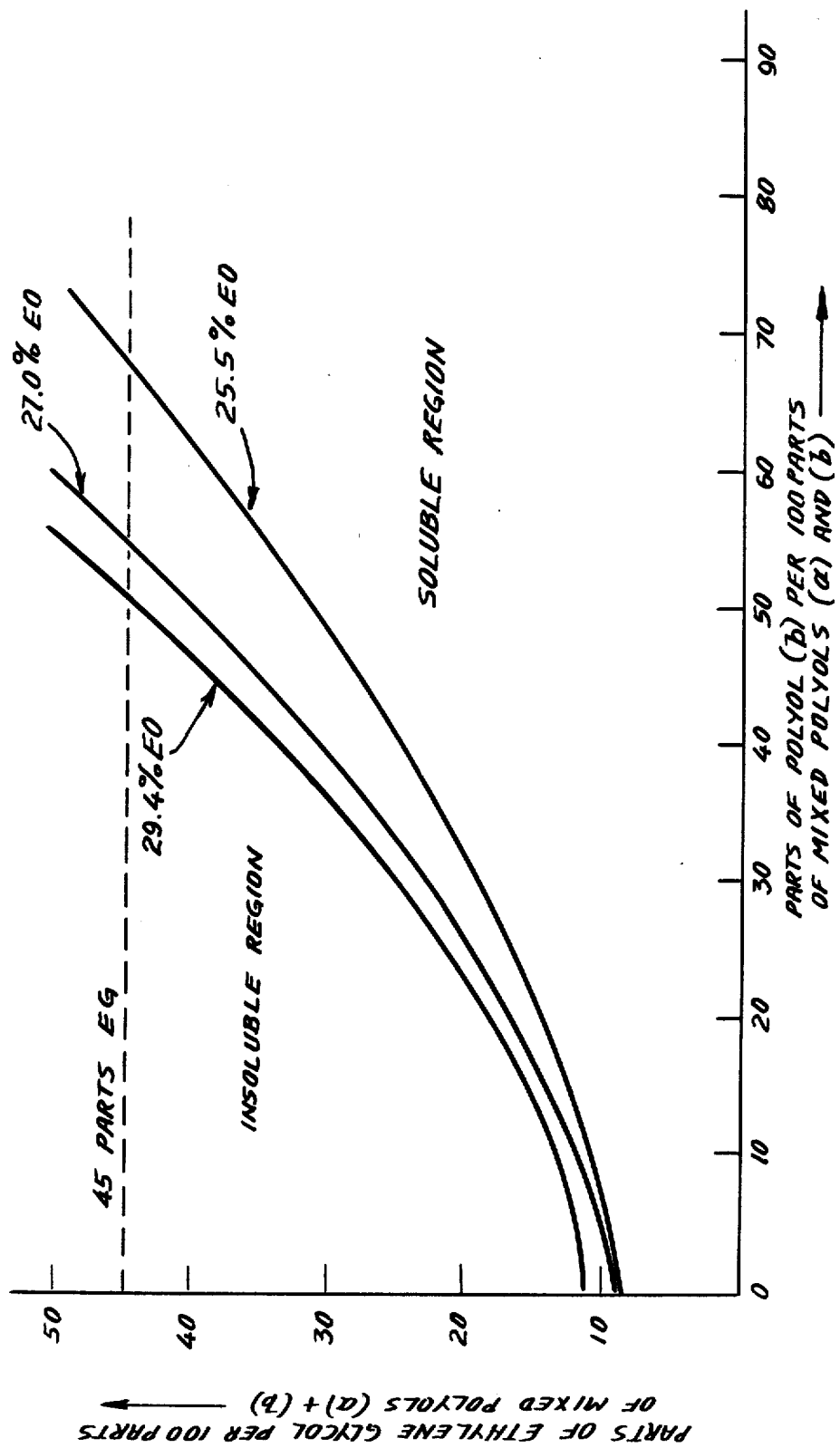

NOVEL COMPOSITIONS AND PROCESS

BACKGROUND OF THE INVENTION

1. Field of the Invention

This invention relates to the preparation of polyurethanes and to polyurethanes so prepared and is more particularly concerned with polyurethanes prepared from an organic polyisocyanate, an aliphatic glycol extender and a particular mixture of two or more polyether polyols.

2. Description of the Prior Art

The preparation of polyurethanes by reaction of an organic polyisocyanate, a polyether polyol and a low molecular weight extender such as an aliphatic glycol is commonplace in the art. The use of copolymers of ethylene oxide and propylene oxide, having varying functionality depending upon the functionality of the initiator used in the copolymerization, has been found to confer particularly useful structural strength properties on such polyurethanes both in cellular and non-cellular forms. Illustratively, U.S. Pat. No. 3,857,800 shows the preparation of polyurethane foams with a reduced tendency to shrink by use of a combination of two polyols one of which can be an ethylene oxide-capped polyoxypropylene polyol having a molecular weight of 3000 to 6000 and a primary hydroxyl content of 20 to 70% and the other of which can be an ethylene oxide-propylene oxide copolymer having a molecular weight of 500 to 2000 and an ethylene oxide content of 20 to 80% by weight. No aliphatic glycol extender is employed in preparing the foams disclosed in this reference.

U.S. Pat. No. 3,945,939 discloses a problem which exists in the preparation of polyurethanes by reaction of an organic polyisocyanate with an ethylene oxide-capped polyoxypropylene using ethylene glycol and like low-molecular weight glycols as the extender. The low molecular weight glycol is incompatible with the polyol in the proportions employed and the reference shows that colloidal silica or certain clays could be utilized to assist in forming a stable dispersion of the glycol in the polyol prior to reaction.

U.S. Pat. No. 4,273,884 describes substantially the same problem and overcomes it by forming an emulsion of the polyol and the low molecular weight glycol prior to reaction with the polyisocyanate.

U.S. Pat. No. 3,798,200 describes the preparation of polyurethanes having improved cut growth and flexcrack resistance by reacting an organic polyisocyanate with a mixture of two different polyether polyols and any of a wide variety of active-hydrogen containing extenders which can include low molecular weight glycols. The two polyether polyols were chosen from a wide variety of such polyols the criticality being said to lie in that one of the two had a peak in the high end of the molecular weight distribution curve and the other had its peak in the lower end of the range but the average molecular weight of the mixture of the two polyols was in the range of 4500 to 20,000. U.S. Pat. No. 3,963,681 discloses a closely related development in the same area but calls for the average molecular weight of the mixture of the two polyols to be in the range of 1000 to 4500.

U.S. Pat. No. 4,065,410 describes a method of increasing the green strength of polyurethane elastomers having a compact skin and a cellular core by using as the extender a mixture of ethylene glycol and up to 30 percent by weight, based on total weight of extender, of a polyol having a molecular weight of less than 1800. A wide variety of the latter polyols are disclosed. Compatibility of the ethylene glycol with the polyol component is not discussed.

We have now found that, not only can the problem of compatibilizing a low molecular weight glycol extender in a polyether polyol be solved in a highly satisfactory manner, but certain properties of the polyurethanes produced from the compatibilized components are greatly enhanced as a direct consequence of the compatibilization. The latter can be achieved, as described below, by the use of a combination of at least two carefully chosen groups of polyoxyethylene polyoxypropylene polyols in proportions such that the aliphatic glycol extender is compatible therewith in the range of proportions in which it is required to be used in preparing the polyurethane.

SUMMARY OF THE INVENTION

This invention comprises an improved process for the preparation of polyurethanes by reaction of an organic polyisocyanate, a polyol and a low molecular weight aliphatic glycol extender wherein the improvement comprises employing as the polyol component a mixture which comprises:

(a) a polyoxypropylene polyoxyethylene polyol having an average functionality from 2 to 4, a molecular weight in the range of about 3,000 to about 10,000 and containing at least 23 percent by weight of ethylene oxide residues; and (b) a polyoxypropylene polyoxyethylene polyol having an average functionality from 2 to 4, a molecular weight in the range of about 750 to about 2,000 and containing at least 45 percent by weight of ethylene oxide;

the proportions by weight of the components (a) and (b) being adjusted so that the aliphatic glycol extender is completely miscible with said mixture of components (a) and (b).

The invention also comprises the polyurethanes prepared in accordance with the process. The invention is particularly concerned with the use of the process set forth above to prepare polyurethanes (cellular, microcellular and non-cellular) using reaction injection molding (RIM) technology and with the polyurethane prepared.

DETAILED DESCRIPTION OF THE INVENTION

The improved process of the invention can be carried out using any of the conventional techniques employed in the art of making polyurethane. The novelty of the process lies in the use of a particular combination of polyols and extender. The improved process of the invention is especially adapted for use in reaction injection molding techniques but can also be applied to a variety of other situations such as spray, pour-in-place and casting applications. The use of the process of the invention has a number of advantages. It gives rise to polyurethanes which have exceptionally high impact strength as well as excellent overall physical properties. Further, the use of the particular combination of polyols and extender allows one to prepare a blend of polyols and extender which is a homogeneous single phase liquid. This contrasts with the two phase polyol components which have hitherto been encountered in using low molecular weight aliphatic glycol extenders in combination with polyether polyols; see the art cited supra. The reactants necessary to prepare polyurethanes of the type under consideration here are normally supplied to the end user by the manufacturer in the form of a two component system. One component (commonly known as the "A side") comprises the organic polyisocyanate and certain additives which are not reactive with the isocyanate. The other component (commonly known as the "B side") comprises the polyol(s) and extender. If the components of the B side are not compatible, as in the case of the prior art systems discussed above, heroic measures have to be taken to seek to stabilize the B side and render it homogeneous. This problem does not exist in respect of the B side which is provided in accordance with the present invention since the components thereof are freely miscible one with another.

This finding greatly facilitates the actual use of the A and B sides in accordance with the present invention. Since the components of the B side are miscible one with another no special precautions have to be taken to maintain homogeneity during storage or in dispensing through equipment such as the high pressure heads and auxiliary equipment routinely employed in RIM processing. Additional advantages which flow from the use of a B side which is homogeneous, as in the case of the present invention, will be apparent to one skilled in the art.

As set forth above the improvement in both processing capability and product properties provided by this invention lies in the use of a particular combination of two different polyoxyethylene polyoxypropylene polyols (a) and (b) as defined hereinabove. As will be seen from the definitions, the two types of polyol differ in molecular weight and ethylene oxide content and can also differ in functionality. Both types of polyol and methods for their preparation are well-known in the art; see, for example, Saunders and Frisch, Polyurethanes; Chemistry and Technology, Part I, Interscience, New York, 1962, pp. 36–37. The polyether polyols (a) and (b) employed in accordance with the invention are inclusive of both block and random copolymers of propylene oxide and ethylene oxide using initiators such as water, ethylene glycol, propylene glycol, glycerol, trimethylolpropane, pentaerythritol and the like.

Although any of the glycols, triols and tetrols meeting the parameters defined in (a) and (b) above can be used in combination, it is preferred to use a combination of a triol meeting the parameters set forth under (a) and a diol meeting the parameters set forth under (b). Further, it is preferred to use a combination of a triol meeting the parameters set forth under (a) but having a molecular weight in the range of about 4,000 to about 7,000 with a diol meeting the parameters set forth under (b) but having a molecular weight in the range of about 1,000 to about 1,500.

The proportions in which the two different polyether polyols (a) and (b) are used in accordance with the invention are a function of the particular polyols to be employed in the combination and, more particularly, of the identity and amount of the low molecular weight aliphatic glycol which is to be incorporated into the combination. It is generally desirable that the amount of polyol (b) which is present in the combination be kept to as low a level as possible consonant with the requirement that the low molecular weight aliphatic glycol be completely miscible with the combination of polyols (a) and (b). Thus it is found that the use of larger proportions of polyol (b) than are necessary to achieve the above stated result tend to detract from the highly advantageous physical properties, particularly in regard to impact strength, of the polyurethanes prepared in accordance with the invention.

The proportions to be employed in any particular combination of the polyols (a) and (b) and any particular aliphatic extender in order to achieve the above stated results can be determined readily by a process of trial and error. To illustrate the methodology to be employed and some of the factors which are involved, reference is made to FIG. 1. The latter shows a plot of solubility of ethylene glycol (a typical low molecular weight aliphatic glycol extender) in a combination of a polyol (b) which is a polyoxyethylene polyoxypropylene diol of molecular weight 1,000 and having a content of ethylene oxide residues of 47% by weight, and a polyol (a) which is represented by each of three polyoxyethylene polyoxypropylene triols all of which have a molecular weight 6500 but differ in ethylene oxide residue content, one being 25.5% w/w, another 27% w/w and the third being 29.4% w/w. The abscissa of the graph of FIG. 1 shows the proportion of polyol (b) in parts by weight per 100 parts by weight of the blend of polyols (a) and (b). The ordinate shows the amount of ethylene glycol in parts by weight per 100 parts by weight of the blend of polyols (a) and (b). Each of the three curves shows, at any given point on the curve, the maximum amount of ethylene glycol which is completely miscible with the blend of polyols (a) and (b) having the composition represented by the point on the abscissa vertically below the point in question on the curve. For any given curve the area above the curve represents the relative proportions in which the polyols (a) and (b) and ethylene glycol, when brought together, would not be completely miscible. The area below any given curve represents the relative proportions in which the three components, when brought together, would be completely miscible.

It will also be seen from FIG. 1 that the proportion of ethylene oxide residues in the polyol (a) plays a significant role in the amount of polyol (b) which is necessary to achieve complete miscibility of the three components at any given level of ethylene glycol. The dotted line shows the respective level of the two polyols (a) and (b) for each of the three different levels of ethylene oxide residues in the polyol (a) necessary to achieve complete miscibility where the ethylene glycol is employed at a level of 45 parts per 100 parts of the polyol combination. It will be seen that the level of polyol (b) necessary to achieve miscibility decreases as the proportion of ethylene oxide residues in polyol (a) increases.

A graph corresponding to that illustrated in FIG. 1 can be generated by routine experimentation for each and every possible combination of polyol (a) and (b) with ethylene glycol or any of the other low molecular weight polyols in accordance with the invention. The particular polyols employed in generating the data from FIG. 1 were chosen as typical of those which can be employed in accordance with the invention. Ethylene glycol was also employed simply for purposes of illustration and any low molecular weight glycol can be employed in accordance with the process of the invention provided all the other parameters are met. Illustrative of such low molecular weight aliphatic glycols, in addition to ethylene glycol, are 1,3-propanediol, 1,4-butanediol, 1,5-pentanediol, 1,6-hexanediol, diethylene glycol, triethylene glycol, tetraethylene glycol, neopentyl glycol, cyclohexanedimethanol, and the like.

In general, the proportion in which the aliphatic glycol extender can be introduced into the mixture of Polyols (a) and (b) and still produce a completely miscible blend lies within the range of about 10 to 100 parts by weight, per 100 parts by weight of said blend of Polyols (a) and (b) depending upon the proportions in which the latter two Polyols are present in the blend. A more preferred range is from about 15 to about 50 parts by weight of aliphatic glycol extender per 100 parts by weight of the blend of Polyols (a) and (b), again depending upon the proportions in which the latter two Polyols are present in order to achieve miscibility. In order to achieve the desired miscibility in the above proportions the proportion in which Polyol (a) is employed can vary from about 0.1 to 4 parts by weight per part of Polyol (b). The appropriate proportion to use in any given instance is readily determined by trial and error.

Any of the organic polyisocyanates commonly employed in the art of preparing polyurethanes of the type set forth herein can be employed in carrying out the process of the invention. Illustrative of such polyisocyanates are 2,4-toluene diisocyanate, 2,6-toluene diisocyanate, 4,4'-methylenebis(phenyl isocyanate), dianisidine diisocyanate, tolidine diisocyanate, hexamethylene diisocyanate, 4,4'-methylenebis(cyclohexyl isocyanate), m-xylylene diisocyanate, 1,5-naphthalene diisocyanate, 1,4-diethylbenzene-$\beta,\beta'$-diisocyanate and the like, including mixtures of two or more of said isocyanates. The polyisocyanates employed in the process of the invention also include liquefied forms of 4,4'-methylenebis(phenyl isocyanate) and of mixtures of the latter with the corresponding 2,4'-isomer. These liquefied forms of said diisocyanates are a well recognized class which comprise stable liquids at temperatures of about 15° C. or higher. Such compositions include the carbodiimide-containing products having isocyanate equivalents from about 130 to about 180 prepared, for example, by heating the original diisocyanate with a carbodiimide catalyst to convert a portion of said isocyanate to carbodiimide in accordance, for example, with the procedure described in U.S. Pat. No. 3,384,653. The liquefied form of said diisocyanates also includes methylenebis(phenyl isocyanates) which have been reacted with minor amounts (from about 0.04 to 0.3 equivalents per equivalent of isocyanate) of low molecular weight glycols as described, for example, in U.S. Pat. Nos. 3,394,164; 3,644,457; 3,883,571; and 4,031,026.

4,4'-methylenebis(phenyl isocyanate), admixtures of this isocyanate with minor amounts of the corresponding 2,4'-isomer, and liquefied forms of these isocyanates are the preferred polyisocyanates for use in accordance with the invention.

As will be apparent to one skilled in the art the process of the present invention is particularly well suited for operation in accordance with a one-shot procedure but can also be applied to a prepolymer process in which event the prepolymer is preferably made using a portion of the polyol (a) and thereby reducing the amount of polyol (b) which is necessary to compatibilize the low molecular weight aliphatic glycol extender with the remainder of the polyol component.

Whichever method of operation is employed, be it one-shot or prepolymer, the process of the invention is carried out in accordance with procedures, and using mixing and dispensing equipment, which are so well-known in the art as not to require recitation herein; see, for example, U.S. Pat. No. 4,306,052 for a detailed account of such procedures. A particularly advantageous manner in which to carry out the process is by use of reaction injection molding technology a detailed description of which is given, for example, in U.S. Pat. No. 4,218,543.

In carrying out the process of the invention the proportions in which the various reactants are employed are such that the overall ratio of equivalents of isocyanate to total equivalents of active-hydrogen containing material are in the range of about 0.9:1.0 to about 1.15:1.0, and preferably in the range of about 0.95:1.0 to about 1.05:1.0. The proportions of equivalents of aliphatic glycol extender to total polyols (a) and (b) can vary over a wide range of about 5:1.0 to about 15:1.0. Preferably the proportions of equivalents of said extender to total polyols (a) and (b) are in the range of about 7:1.0 to about 12:1.0. In general the higher the proportion of aliphatic extender the higher the flexural modulus.

The process of the invention is generally carried out in the presence of a catalyst for the reaction between hydroxyl groups and isocyanate groups. Any of the catalysts conventionally employed in the art to catalyze the reaction of an isocyanate with a reactive hydrogen containing compound can be employed for this purpose; see, for example, Saunders et al., Polyurethanes, Chemistry and Technology, Part I, Interscience, New York, 1963; pages 228–232; see also, Britain et al., J. Applied Polymer Science, 4, 207–211, 1960. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Representative organotin catalysts are stannous octoate, stannous oleate, dibutyltin diacetate, dibutyltin dioctoate, dibutyltin dilaurate, dibutyltin maleate, dibutyltin mercaptopropionate, dibutyltin didodecylmercaptide, dibutyltin bis-(isoctylthioglycolate), and the like. Representative tertiary organic amine catalysts are triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, N,N-dimethylcyclohexylamine, and the like, and mixtures of the above in any combination.

The preferred catalysts are the organo metallic compounds and particularly the dialkyl tin salts such as the dibutyltin compounds noted above.

The amount of catalyst employed in any given situation will depend upon the nature of the other components of the mixture and the desired reaction times. Generally speaking, the catalyst is employed within a range of about 0.01 percent by weight to about 5 percent by weight and preferably from about 0.02 to about 3 percent by weight based on total weight of the reaction mixture.

In addition to the various reaction components discussed above and used in the process of the invention there can also be introduced into the reaction mixture other optional additives such as dispersing agents, surfactants, flame retardants, pigments, reinforcing agents, fibers and the like in accordance with procedures well-known in the art.

In an optional embodiment of the invention it is found that minor amounts [up to about 1 equivalent per equivalents of the mixture of polyols (a) and (b)] of a low molecular weight cross-linking agent such as trimethylolpropane, alkoxylated trimethylolpropane such as the adducts of trimethylolpropane with ethylene oxide, propylene oxide and the like, pentaerythritol and adducts thereof with ethylene oxide, propylene oxide and the like, can be included in the reaction mixture employed in preparation of the polyurethanes of the invention. The trihydric cross-linking agents are preferred. Generally speaking, the cross-linking agent is introduced into the reaction mixture in the form of a blend with the other polyol components.

The process of the invention is of particular application in the preparation of non-cellular polyurethanes and, more particularly, non-cellular polyurethanes having thermoplastic-like properties. However, it is also possible to utilize the process of the invention to prepare microcellular and cellular moldings by the incorporation of blowing agents into the reaction mixture. The blowing agent may be incorporated into the reaction mixture in appropriate amounts depending on the required density of the resulting molding. Any of the blowing agents known in the art can be employed including water and volatile inert organic liquids, preferably those having boiling points in the range of about 22° C. to about 35° C. Illustrative of such liquids are butane, hexane, heptane, methylene chloride, chloroform, monofluorotrichloromethane, chlorodifluoromethane, dichlorodifluoromethane, and the like. The blowing agents employed may also include compounds which decompose at temperatures above room temperature to liberate a gas such as nitrogen. Examples of such compounds are azo compounds such as azoisobutyric acid nitrile and the like.

The polyurethanes which are prepared in accordance with the invention have, for the most part, a two phase morphology and are characterized by a markedly higher level of impact strength than has been achieved using single polyols of type (a) discussed above. In addition, the polyurethanes prepared in accordance with the invention retain all the good structural strength properties previously associated with polyurethanes derived from single polyols of type (a) even without postcure. The green strength of the material at demold is also good. These properties of the polyurethanes produced in accordance with the invention are highly advantageous and supplement the benefits already discussed above in regard to the ability to operate with a polyol-extender component which is completely miscible.

The following examples describe the manner and process of making and using the invention and set forth the best mode contemplated by the inventors of carrying out the invention but are not to be construed as limiting.

EXAMPLE 1

A series of non-cellular polyurethanes was prepared using an Admiral Equipment Company 2000 HP RIM machine and employing two reactant streams. Stream A in all cases was a liquid form of 4,4'-methylenebis(phenyl isocyanate) in which a portion of the isocyanate had been converted to carbodiimide [isocyanate equivalent = 143: prepared as described in U.S. Pat. No. 3,384,653]. Stream B was a completely miscible blend of ethylene glycol, a polyoxyethylene polyoxypropylene triol [Polyol (a)] having molecular weight of 6500 and ethylene oxide content of 27% w/w [Thanol ® SF-6503; Texaco] and a polyoxyethylene polyoxypropylene diol [Polyol (b)] having a molecular weight of 1000 and ethylene oxide content of 47% w/w [Poly ® G55-112: Olin]. The proportions (all parts by weight) of the three components in Stream B were varied and are recorded in TABLE I below. Stream B also contained 0.15 parts, per 100 parts, of dibutyltin dilaurate catalyst [M and T: T-12]. Streams A and B were brought together and mixed in the appropriate proportions to achieve the NCO/OH indices shown in TABLE I.

Stream A was maintained at 27° C. and Stream B at 49° C. The mold (16 inch×60 inch×0.150 inch) was preheated to 66° C. The demold time was 1.5 minutes in all cases and samples of the demolded materials were submitted to physical testing. Additional samples of the same materials were postcured at 121° C. for 1 hour and then submitted to physical testing. The properties determined on the materials which were not postcured are shown in TABLE I and those of the postcured samples are shown in TABLE IA.

TABLE

| Stream B compositions | | | | | | | | | |
|---|---|---|---|---|---|---|---|---|---|
| Polyol (a) | 77 | 77 | 77 | 67 | 67 | 67 | 56 | 56 | 56 |
| Polyol (b) | 23 | 23 | 23 | 33 | 33 | 33 | 44 | 44 | 44 |
| Ethylene glycol | 18 | 18 | 18 | 24 | 24 | 24 | 33 | 33 | 33 |
| NCO/OH Index | 1.0 | 1.05 | 1.10 | 0.95 | 1.00 | 1.05 | 0.95 | 1.00 | 1.05 |
| Properties | | | | | | | | | |
| [1]Density g./cc. | 1.17 | 1.14 | 1.12 | 1.16 | 1.16 | 1.14 | 1.10 | 1.13 | 1.13 |
| [2]Hardness Shore D | 62 | 62 | 64 | 70 | 70 | 70 | 78 | 80 | 78 |
| [3]Tensile Strength at break: psi | 3560 | 3680 | 3600 | 4150 | 4290 | 4240 | 4380 | 4700 | 4050 |
| [3]Elongation at break % | 240 | 230 | 200 | 200 | 200 | 215 | 170 | 140 | 115 |
| [4]Flexural Modulus (70° F.) psi | 26,200 | 28,400 | 30,000 | 53,900 | 60,900 | 61,600 | 127,800 | 141,800 | 131,300 |
| [5]Flexural Modulus Ratio −20° F./+158° F. | 9.4 | 9.6 | 10.0 | 14.0 | 12.9 | 12.1 | 12.2 | 11.7 | 10.7 |
| Notched Izod Impact ft. lb/in.: 75° F. | 12.2 | 12.6 | 12.3 | 15.3 | 15.0 | 14.3 | 12.2 | 9.7 | 11.2 |
| −20° F. | 18.2 | 19.1 | 9.2 | 10.7 | 9.2 | 15.7 | 2.9 | 2.8 | 1.8 |
| [6]Die "C" Tear: lbs/in. | 440 | 460 | 450 | 620 | 685 | 650 | 850 | 905 | 750 |
| [7]Split Tear: lbs/in. | 249 | 224 | 206 | 290 | 317 | 292 | N.T. | N.T. | N.T. |
| [8]Heat Sag: in. 4" overhang 250° F./1 hr. | 0.80 | >0.96 | 0.92 | 0.87 | 0.75 | 0.53 | 0.28 | 0.34 | 0.44 |

TABLE IA

[Postcured]

| Stream B compositions | | | | | | | | | |
|---|---|---|---|---|---|---|---|---|---|
| Polyol (a) | 77 | 77 | 77 | 67 | 67 | 67 | 56 | 56 | 56 |
| Polyol (b) | 23 | 23 | 23 | 33 | 33 | 33 | 44 | 44 | 44 |
| Ethylene glycol | 18 | 18 | 18 | 24 | 24 | 24 | 33 | 33 | 33 |
| NCO/OH Index | 1.0 | 1.05 | 1.10 | 0.95 | 1.00 | 1.05 | 0.95 | 1.00 | 1.05 |
| Properties | | | | | | | | | |
| [1]Density g./cc. | 1.14 | 1.14 | 1.13 | 1.12 | 1.12 | 1.09 | 1.07 | 1.13 | 1.15 |
| [2]Hardness Shore D | 60 | 64 | 62 | 72 | 70 | 71 | 76 | 76 | 78 |
| [3]Tensile Strength at break: psi | 3780 | 3870 | 3830 | 4600 | 4330 | 4210 | 4660 | 4580 | 4430 |
| [3]Elongation at break % | 350 | 270 | 250 | 260 | 270 | 255 | 210 | 230 | 175 |
| [4]Flexural Modulus (5° F.) psi | 26,600 | 28,800 | 35,700 | 49,800 | 53,300 | 64,500 | 116,400 | 124,100 | 127,800 |
| [5]Flexural Modulus Ratio −20° F./+158° F. | 6.9 | 7.9 | 6.2 | 9.4 | 6.2 | 5.6 | 8.6 | 7.1 | 5.7 |
| Notched Izod Impact ft. lb/in.: 75° F. | 13.0 | 12.8 | N.T. | 16.8 | 17.0 | 18.6 | 13.0 | 11.3 | 7.3 |
| −20° F. | 18.2 | 19.1 | N.T. | 14.2 | 12.1 | 11.5 | 5.2 | 2.8 | 2.1 |
| [6]Die "C" Tear: lbs/in. | 500 | 460 | 520 | 610 | 640 | 610 | 860 | 870 | 810 |
| [7]Split Tear: lbs/in. | 210 | 232 | 250 | 302 | 296 | 298 | N.T. | N.T. | N.T. |
| [8]Heat Sag: in. 4" overhang 250° F./1 hr. | 0.16 | 0.14 | 0.22 | 0.32 | 0.11 | 0.03 | 0.18 | 0.02 | 0.04 |

Footnotes to TABLE I and TABLE IA
1: ASTM D-762
2: ASTM D-2240
3: ASTM D-412
4: ASTM D-790
5: ASTM D-256
6: ASTM D-624
7: ASTM D-1938
8: Test CTZ006A: General Motors, Chevrolet Division

EXAMPLE 2

The procedure described in Example 1 was repeated with the same Stream A but a Stream B (completely miscible) which had the following components in the proportions shown in TABLE II below (all parts by weight).

Polyol (a)=polyoxyethylene polyoxypropylene triol having a molecular weight of 6500 and an ethylene oxide content of 29.4% w/w.

Polyol (b)=polyoxyethylene polyoxypropylene triol having a molecular weight of 1000 and an ethylene oxide content of 49% w/w.

Stream A was maintained at 24° C., Stream B at 27° C. Mold temperature was 80°-82° C. Demold time and postcure conditions were the same as in Example 1. Streams A and B were mixed in the appropriate proportions to achieve the NCO/OH indices noted in TABLE II.

There was thus obtained a series of non-cellular polyurethanes having high impact strength and high flexural modulus as evidenced by the physical properties shown in TABLE II where the properties of the postcured samples (250° F./1 hr.) are shown.

TABLE II

| Stream B composition | | | |
|---|---|---|---|
| Polyol (a) % Eo 29.4 | 50 | 50 | 50 |
| Polyol (b) % EO 49 | 50 | 50 | 50 |
| Ethylene glycol | 45 | 45 | 45 |
| T-12 | 0.15 | 0.15 | 0.15 |
| NCO/OH index | 0.99 | 1.03 | 1.05 |
| Density g./cc. | 1.13 | 1.11 | 1.11 |
| Hardness, Shore D | 78 | 80 | 79 |
| Tensile strength: psi | 5420 | 5390 | 5530 |
| Elongation at break: % | 120 | 100 | 80 |
| Flexural modulus: psi | | | |
| +75° F. | 216,100 | 212,500 | 216,400 |
| −20° F. | N.T. | 362,100 | N.T. |
| +158° F. | N.T. | 80,020 | N.T. |
| Ratio modulus −20° F./158° F. | N.T. | 4.5 | N.T. |
| Notched Izod impact: ft. lb./in.: 75° F. | 15.0 | 7.0 | 5.9 |
| Heat sag: inches 4" overhang: 250° F./1 hr. | 0.17 | 0.06 | 0.04 |

EXAMPLE 3

The experiments described in Example 2 were repeated exactly as described with the sole exception that 3 parts by weight, per 100 parts of Stream B, of a cross-linker (adduct of propylene oxide and glycerin; equiv. wt.=89) were added to one series and 6 parts by weight, per 100 parts of Stream B, of the same cross-linker were added in the second series. The physical properties of the postcured samples (non-postcured properties in parentheses) of the polyurethanes so obtained are set forth in TABLE III below.

TABLE III

| | 3 parts cross-linker | | | 6 parts cross-linker | | |
|---|---|---|---|---|---|---|
| NCO Index | 0.95 | 0.975 | 1.00 | 0.95 | 1.00 | 1.05 |
| Density g./cc. | 1.11 (1.16) | 1.13 (1.14) | 1.13 (1.12) | 1.08 (1.11) | 1.12 (1.09) | 1.13 (1.12) |
| Hardness; Shore D | 76 (78) | 77 (79) | 75 (77) | 75 (76) | 72 (76) | 76 (77) |
| Tensile strength: psi | 5610 (4550) | 5890 (4640) | 5260 (4670) | 5270 (4300) | 5590 (4590) | 5230 (5110) |
| Elongation at break: % | 140 (40) | 160 (50) | 150 (70) | 120 (40) | 130 (60) | 100 (80) |

TABLE III-continued

| | 3 parts cross-linker | | | 6 parts cross-linker | | |
|---|---|---|---|---|---|---|
| NCO Index | 0.95 | 0.975 | 1.00 | 0.95 | 1.00 | 1.05 |
| Flexural modulus | | | | | | |
| psi 75° F. | 203,300 | 194,100 | 207,000 | 206,100 | 220,600 | 209,500 |
| | (216,200) | (193,800) | (220,700) | (207,100) | (211,600) | (228,900) |
| −20° F. | 326,700 | N.T. | 312,900 | 321,800 | 338,200 | 349,700 |
| +158° F. | 63,000 | N.T. | 64,700 | 67,900 | 76,400 | 71,000 |
| Ratio modulus −20° F./+158° F. | 5.2 | — | 4.8 | 4.7 | 4.4 | 4.9 |
| Notched Izod Impact: ft. lbs/in. | | | | | | |
| 75° F. | 11.7 | 10.4 | 3.0 | 6.41 | 5.79 | 1.72 |
| | (3.8) | (3.8) | (2.4) | (2.91) | (2.82) | (0.99) |
| Heat Sag: in. | | | | | | |
| 4" overhang | 0.11 | 0.09 | 0.05 | 0.11 | 0.03 | 0.05 |
| 250° F./1 hr. | (0.48) | (0.46) | (0.36) | (0.50) | (0.42) | (0.22) |

EXAMPLE 4

Using exactly the procedure described in Example 2 and employing the same Stream A but replacing Stream B by a completely miscible stream of the following composition (all parts by weight) (the amount of Polyol (b) employed was just sufficient to achieve complete miscibility of Stream B):

Polyol (a) [same as Example 1]: 61
Polyol (b) [polyoxyethylene polyoxypropylene glycol M.W. = 1000: Ethylene oxide content 52% w/w: Formrez EPD-112: Witco]: 39
Ethylene glycol: 32
T-12: 0.075 there was obtained a non-cellular polyurethane having the properties shown as Run 4-1 in TABLE IV. The two streams were employed in the proportion of 173 parts of Stream A per 132 parts of Stream B for an NCO index of 1.05. For purposes of comparison the above experiment was repeated but replacing the above Polyol (b) by two other polyols one of which was on the upper limit of the definition of Polyol (b) which can be employed in accordance with the invention and the other of which is outside the limit of parameters of Polyol (b) which can be employed in the process of the invention. Both polyols were employed in proportions such that the ethylene glycol employed was just miscible in the Stream B. The composition of Stream B in these two comparison runs was as follows.

| Run No. 4-2 | | |
|---|---|---|
| Polyol (a) | [same as Example 1] | : 28 |
| Polyol (b) | [polyoxyethylene polyoxypropylene glycol: M.W. = 2000: E.O. content = 49.6% w/w] | : 72 |
| Ethylene glycol | | : 32 |

| Run No. 4-3 | | |
|---|---|---|
| Polyol (a) | [same as Example] | : 47 |
| Polyol (b) | [polyoxyethylene polyoxypropylene glycol: M.W. = 512: E.O. content = 47.2% w/w] | : 53 |
| Ethylene glycol | | : 32 |

The properties of the samples prepared from the above Streams B are also shown in TABLE IV. It will be seen that those of Run 4-2 are somewhat lower in tensile strength properties and significantly lower in flexural modulus while those of Run 4-3 are significantly lower in both tensile strength and flexural modulus.

TABLE IV

| | | Run | | |
|---|---|---|---|---|
| | | 4-1 | 4-2 | 4-3 |
| Density g./cc. | : | 0.89 | 0.99 | 0.86 |
| Hardness, Shore D | : | 73 | 70 | 77 |
| Tensile Strength: psi | : | 2475 | 2250 | 1275 |
| Elongation at break: % | : | 115 | 60 | <5 |
| Flexural modulus: psi | : | 115,830 | 68,476 | 90,313 |
| Heat sag: inches 4" overhang: 250° F./1 hr. | : | 0.08 | 0.05 | — |

EXAMPLE 5

Using the same procedure and reactants as set forth in Example 1 but varying the proportions of Polyols (a) and (b) (same materials as used in Example 1) there was prepared a series of non-cellular polyurethanes, all at an NCO index of 1.01. The various proportions of reactants (all parts by weight) and the physical properties of the polyurethanes so obtained are set forth in TABLE V below. It will be noted that in all cases the ethylene glycol extender was miscible with the polyol component. However, in the case in which the Polyol (b) was employed alone, i.e. in the absence of any Polyol (a) the impact strength of the polyurethane, as shown by the Notched Izod value was dramatically less than that of the polyurethanes in which Polyol (a) was employed. It was also noted that the polyurethane in which the higher content of Polyol (a) was employed was possessed of the higher impact strength.

TABLE V

| | | | |
|---|---|---|---|
| Polyol (a) | 0 | 25 | 40 |
| Polyol (b) | 100 | 75 | 60 |
| Ethylene glycol | 42.32 | 42.32 | 42.32 |
| Density g./cc. | 1.097 | 0.983 | 1.027 |
| Hardness, Shore D | 80 | 78 | 76 |
| Flexural modulus (70° F.): psi | 339.2 | 211.3 | 182.2 |
| Flexural strength: psi | 11,190 | 7,640 | 7,080 |
| Tensile strength: psi | 5380 | 4390 | 4560 |
| Elongation at break % | 80 | 140 | 170 |
| Tensile set % | 40 | N.T. | N.T. |

TABLE V-continued

| Notched Izod Impact | | | |
|---|---|---|---|
| ft. lb./in.: 75° F. | 0.89 | 3.72 | 5.61 |
| Heat sag: in. | 0.19 | 3.72 | 5.61 |
| 4" overhang: 250° F./1 hr. | | | |

EXAMPLE 6

It was found that by using a blend of 76.5 parts by weight of the Polyol (a) employed in Example 1 and 23.5 parts by weight of the Polyol (b) employed in Example 1 but having a content of 45% w/w of ethylene oxide, it was possible to incorporate a maximum of 19.0 parts by weight of ethylene glycol and still obtain a completely miscible mixture. The blend of Polyols (a) and (b) employed had an average ethylene oxide content of 31.3 percent w/w. Accordingly, a single polyoxyethylene polyoxypropylene polyol having the same ethylene oxide content (31.3% w/w) was tested for ability to form a miscible blend with ethylene glycol. It was found that only 10 parts by weight of ethylene glycol could be blended with this polyol before the mixture separated into two phases.

We claim:

1. In a process for the preparation of a polyurethane by reaction of an organic polyisocyanate, a polyol and low molecular weight aliphatic glycol extender the improvement which comprises employing as the polyol component a mixture which comprises;
   (a) a polyoxypropylene polyoxyethylene polyol having an average functionality from 2 to 4, a molecular weight in the range of about 3,000 to about 10,000 and containing at least 23 percent by weight of ethylene oxide residues; and
   (b) a polyoxypropylene polyoxyethylene polyol having an average functionality from 2 to 4, a molecular weight in the range of about 750 to about 2,000 and containing at least 45 percent by weight of ethylene oxide;
the proportions by weight of the components (a) and (b) being adjusted so that the aliphatic glycol extender is completely miscible with said mixture of components (a) and (b).

2. A process in accordance with claim 1 wherein the aliphatic glycol extender is ethylene glycol.

3. A process in accordance with claim 2 wherein the components (a) and (b) are employed in a ratio by weight of from 0.10 to 4.0 parts of the component (b) per part of the component (a).

4. A process in accordance with claim 1 wherein the organic polyisocyanate is 4,4'-methylenebis(phenyl isocyanate).

5. A process in accordance with claim 4 wherein the 4,4'-methylenebis(phenyl isocyanate) is in a form which is a liquid at 15° C.

6. In a process for the preparation of a polyurethane using a reaction injection molding technique in which an organic polyisocyanate, a polyol and a low molecular weight aliphatic glycol extender are brought together and reacted, the improvement which comprises employing as the polyol component a mixture which comprises:
   (a) a polyoxypropylene polyoxyethylene triol having a molecular weight in the range of about 3,000 to about 10,000 containing at least 23 percent by weight of ethylene oxide residues; and
   (b) a polyoxypropylene polyoxyethylene diol having a molecular weight in the range of about 750 to about 2,000 and containing at least 45 percent by weight of ethylene oxide;
the proportions by weight of the components (a) and (b) being adjusted so that the aliphatic glycol extender is completely miscible with said mixture of components (a) and (b).

7. A process in accordance with claim 6 wherein the aliphatic glycol extender is ethylene glycol and said extender is incorporated into the blend of said components (a) and (b) prior to reaction of said blend with said polyisocyanate.

8. A process in accordance with claim 6 or 7 wherein the organic polyisocyanate is 4,4'-methylenebis(phenyl isocyanate).

9. A process in accordance with claim 8 wherein the 4,4'-methylenebis(phenyl isocyanate) is in a form which is a liquid at 15° C.

10. A process in accordance with claim 6 wherein component (a) has a molecular weight of about 6,500 and contains approximately 27 percent by weight of ethylene oxide residues and component (b) has a molecular weight of about 1,000 and contains approximately 50 percent by weight of ethylene oxide residues.

11. In a process for the preparation of an elastomeric polyurethane utilizing two reaction Streams A and B which are brought together and reacted using a reaction injection molding technique said Stream A comprising an organic polyisocyanate and said Stream B comprising a blend of polyol and low molecular weight aliphatic glycol extender, the improvement comprising employing as Stream B a homogeneous blend of from 5 to 50 parts by weight, per 100 parts by weight of said blend, of aliphatic glycol extender the remainder of said blend comprising a mixture of a polyoxypropylene polyoxyethylene triol having a molecular weight in the range of about 3,000 to about 10,000 and containing at least 23 percent by weight of ethylene oxide residues and a polyoxypropylene polyoxyethylene diol having a molecular weight in the range of about 750 to about 2,000 and containing at least 45 percent by weight of ethylene oxide, said triol and said diol being present in such proportions that said aliphatic glycol extender is completely miscible therein.

12. A process in accordance with claim 11 wherein said Stream B comprises a blend of from 7.5 to 25 parts, per 100 parts of the blend, of ethylene glycol, the remainder of said blend comprising a mixture of a polyoxypropylene polyoxyethylene triol having a molecular weight of about 6,500 and containing approximately 27 percent by weight of ethylene oxide residues and a polyoxypropylene polyoxyethylene glycol having a molecular weight of about 1,000 and containing approximately 50 percent by weight of ethylene oxide residues said triol and said diol being present in such proportions that said aliphatic glycol extender is completely miscible therein.

* * * * *